(12) United States Patent
Allman

(10) Patent No.: US 6,820,160 B1
(45) Date of Patent: Nov. 16, 2004

(54) APPARATUS FOR OPTICALLY ISOLATING A USB PERIPHERAL FROM A USB HOST

(75) Inventor: Stuart Allman, Bothell, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 471 days.

(21) Appl. No.: 09/935,017

(22) Filed: Aug. 21, 2001

(51) Int. Cl.[7] .............................................. G06F 13/00
(52) U.S. Cl. ........................... 710/305; 710/36; 710/62
(58) Field of Search ............................. 710/36, 52, 62, 710/100, 107, 305, 313

(56) References Cited

U.S. PATENT DOCUMENTS

| | | | |
|---|---|---|---|
| 6,408,351 B1 * | 6/2002 | Hamdi et al. .................. | 710/63 |
| 6,415,342 B1 * | 7/2002 | Wahl et al. .................. | 710/100 |
| 6,584,519 B1 * | 6/2003 | Russell ........................ | 710/62 |

* cited by examiner

Primary Examiner—Glenn A. Auve
(74) Attorney, Agent, or Firm—Wagner, Murabito & Hao LLP

(57) ABSTRACT

A peripheral device having bus isolation from a host computer is disclosed. The peripheral device has a microcontroller which receives a plurality of input output (I/O) signals from a plurality of logic devices in the peripheral devices. The microcontroller translates the plurality of I/O signals to signals comprehensible by I/O bus and transmits the translated signal over a serial bus. The peripheral device further includes a first unidirectional to bi-directional converter which receives I/O signals from the microcontroller and directs the signal in accordance with a directional signal from the microcontroller. The optical isolation barrier comprises of a number of optical isolating devices, which isolates the peripheral from the host and other peripherals. The peripheral device further includes a second unidirectional to bi-directional converter which has a separate ground potential then the first unidirectional to bi-directional converter. The separation of ground potentials between the two converters and isolation of the peripheral device from the host computer with fewer optical isolation circuits substantially reduces noise, ground loop and possible electrical hazards along with substantial reduction in cost.

19 Claims, 8 Drawing Sheets

315

600

```
┌─────────────────────────────────────────────────┐
│ THE MICROCONTROLLER TRANSLATES BETWEEN INPUT OUTPUT │
│   (I/O) SIGNALS OF THE PERIPHERAL DEVICE LOGIC OF THE │
│  PERIPHERAL DEVICE AND SERIAL BUS SIGNALS WHEREIN THE │
│  SERIAL BUS SIGNALS MAY BE FEWER IN NUMBER THAN THE I/O │
│                      SIGNALS                    │
│                        610                      │
└─────────────────────────────────────────────────┘
                         │
                         ▼
┌─────────────────────────────────────────────────┐
│  THE ISOLATOR ELECTRONICALLY ISOLATING THE BUS SIGNALS TO │
│          GENERATE ISOLATED BUS SIGNALS           │
│                        620                      │
└─────────────────────────────────────────────────┘
                         │
                         ▼
┌─────────────────────────────────────────────────┐
│ CIRCUITRY IS USED TO INTERFACE THE ISOLATED BUS SIGNALS │
│ OVER THE SERIAL BUS TO OPTICALLY ISOLATE THE PERIPHERAL │
│           DEVICE LOGIC FROM THE SERIAL BUS       │
│                        630                      │
└─────────────────────────────────────────────────┘
```

FIGURE 6

APPARATUS FOR OPTICALLY ISOLATING A USB PERIPHERAL FROM A USB HOST

FIELD OF THE INVENTION

The present invention relates to the field of interconnecting computers and their peripherals via a serial bus. More specifically embodiments of the present invention relate to the field of isolating a Universal Serial Bus (USB) host device from a plurality of USB peripheral devices.

BACKGROUND OF THE INVENTION

In a typical computer system, a computer with a microprocessor may be connected to a plurality of peripheral devices (e.g., printer, mouse, modem, scanner, test equipment etc. . . . ) by one or several electrical buses and through several different ports. Different peripheral devices have interfaces with different form factors and different electrical characteristics, and these communications ports are used for variety of different peripheral devices. Each peripheral device may be connected to the computer with a dedicated port and each one of these dedicated ports may have different electrical characteristics. These different electrical characteristics (i.e., serial, parallel or other mode of communication) may require different connectors and different cables, which run from the peripheral to the port and from the port to the microprocessor. The necessity for having a different cable for each of the peripherals connected to a host computer resulted in an assortment of cable connectors connected to a host computer.

The requirements for different connectors for different peripherals led to the development of standardized cables and protocol capable of connecting different peripherals to a host computer. One emerging design, responding to the need for a reduced number of cable connectors, is the Universal Serial Bus (USB). A universal serial bus is a standardized bus used to connect different peripherals with different interface requirements to a host computer, thus replacing the method of using different connectors for different port capabilities. A USB replaces the multiple cable and connector types with a single standardized connection system.

The USB also permits the connection and disconnection of USB compatible peripheral devices while the computer is turned on. Prior to implementation of USB, connecting a peripheral to a host required turning off and rebooting the host computer. USB eliminates the typical turning off and rebooting procedures and a peripheral can be connected without the need for turning off and rebooting of the host device.

A host computer capable of communication with its peripheral via the USB is generally known as a USB host and the peripherals supporting USB technology are known as USB peripheral devices. Most USB host computers support a plurality of USB peripherals transacting with a USB host computer through a number of different electrical signals. A typical USB peripheral device may be a keyboard, a mouse, a sound system or even an oscilloscope or test equipment. Virtually any peripheral can be developed having a USB port interface.

Generally, peripheral devices, connected to a host computer, are electrically isolated from the host device for variety of reasons. In many instances, ground currents will flow between a host computer and the peripheral connected to it and induce significant noise in certain types of devices. For example, an oscilloscope will typically measure down into the microvolt range and ground loop hum will severely affect the ability of the instrument to operate. High quality audio devices and medical instruments are also approaching this realm of electrical sensitivity. Therefore, electrical isolation of the peripheral from the host helps reduce or eliminate ground loop hum or other types of signal noise on the bus.

In devices operating with high voltage, safety is an important factor. For a device such as monitor, oscilloscope, test equipment, or LCD backlight the risk of high voltage spikes and static discharge causing destruction of the USB host are ever present. Furthermore, in cases where a plurality of peripherals are coupled to a host computer, malfunctioning of one device may affect the operation of other devices. Often, a difference in electrical requirements or a difference in functions performed by one peripheral device may have an adverse affect on other devices unless they are isolated. To reduce or even eliminate the hazards described above, attempts have been made to isolate peripheral devices from host devices.

Therefore, the USB works well for (1) peripherals that are bus powered (2) do not contain sensitive elements, and USB devices for which (3) their use does not have the ability to apply voltage over the potential of the bus voltage. However, for devices that violate these generalities, isolating the USB host from the USB device may provide a design improvement.

Conventional Art FIG. 1 depicts a conventional coupling of a peripheral device 150 and a host computer 110 which are electrically isolated yet capable of communication.

In system 100, peripheral device 150 is connected to host device 110 via a DC connection of four signal lines, 111–114. Signal lines 112 and 114 are data transmission lines. Ground signal 111 is connected between host device 110 and peripheral 150, and power signal 113 draws power from host device 110. Isolation device 130 isolates host device 110 from the rest of the peripheral system 140. According to the conventional method used by the industry, isolation of host device 110 from the rest of the peripheral system 140 may be achieved by isolation of the plurality of I/O signals 180/160 individually. Each I/O signal from peripheral device 140 is optically isolated by isolators 130.

Isolating a peripheral from a host computer helps achieve the goal of securing safety of the computer operator as well as preventing ground currents flow between host and peripherals. Flow of such current induces significant noise in certain types of sensitive devices, in devices that measure in micorvolt range a ground loop severely affects the ability of the instrument to operate.

The problem with system 100 is that it requires many of the I/O signal lines 180 and 160 to be isolated individually. In many devices, the isolation circuitry is the most expensive part of the design. Therefore, what is desired is an interface that provides isolation of the USB while limiting or reducing the number of signal lines that need to be isolated.

Therefore, a need exists to design a device allowing different USB peripherals to connect to a host device via a single connector which provides electrical isolation in a safe, economical and electronically efficient manner.

SUMMARY OF THE INVENTION

Accordingly, an embodiment of the present invention provides an apparatus which enables a USB host computer to economically isolate a plurality of coupled USB peripheral devices. The USB peripheral devices are equipped with individual optical isolation barriers with a reduced number of isolation elements. Another embodiment of the present invention provides protection against electrical noise inherent to a device supporting a plurality of peripherals with a wide range of voltage requirements and electrical characteristics. As the result of reduced number of isolating elements substantial economic gains can be realized.

A peripheral device having bus isolation from a host computer is disclosed. The peripheral device has a microcontroller, which interfaces with a plurality of input output (I/O) signals from a plurality of logic devices in the peripheral device. The microcontroller translates the plurality of I/O signals to signals compatible with a serial bus. The peripheral device further includes a first unidirectional to bi-directional converter which receives the signals from the microcontroller and directs the signals in accordance with an instantaneous directional bus signal from the microcontroller. An optical isolation barrier comprises a number of optical isolating devices, which isolate these bus compatible signals from another unidirectional to bi-directional converter. The second unidirectional to bi-directional converter has a separate ground potential than the first unidirectional to bi-directional converter and is coupled to a USB interface. The second converter supplies isolated bus signals.

The present invention advantageously locates the isolation barrier on the USB signals rather than the peripheral I/Os, thereby needing only to isolate a limited number of signals. This may lead to a more economical result. The isolation can be performed using optical elements. The separation of ground potentials between the two converters and isolation of the peripheral device from the host computer with fewer optical isolation circuits substantially reduces noise, ground loop and possible electrical hazards along with possible substantial reduction in cost.

More specifically, a peripheral device with bus isolation is disclosed. The peripheral device includes a microcontroller for receiving a plurality of input/output (I/O) signals from peripheral device logic. The microcontroller translates the plurality of I/O signals to signals compatible with a serial bus and for transmission over the serial bus. The number of signals transmitted over the serial bus are fewer than the plurality of I/O signals received by the microcontroller. The peripheral device further includes a first unidirectional to bi-directional converter, which is electrically coupled to the microcontroller. In one embodiment of the present invention, an optical isolation barrier is coupled to the first unidirectional to bi-directional converter via unidirectional signal lines. A second unidirectional to bi-directional converter is then coupled to the optical isolation barrier via isolated unidirectional signal lines. The second converter generates isolated bus signals and is then coupled to a serial bus interface for interfacing with a host device using said plurality of I/O bus signals.

The microcontroller generates a bus direction signal to indicate if the microcontroller is sending or receiving data. This signal is supplied to both converters so that proper bi-directional to unidirectional and, vice-versa, conversion can be accomplished. In one implementation, this signal originates from a dedicated pin on the microcontroller. A USB host may also have the ability to indicate the bus direction across the isolated barrier.

These and other objects and advantages of the present invention will no doubt becomes obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiment of the invention and, together with the description, serve to explain the principles of the invention:

Conventional Art

FIG. 6 illustrates a method for isolating a USB peripheral device from a USB host computer.

DETAILED DESCRIPTION OF THE INVENTION

Reference will now be made in detail to the preferred embodiments of the present invention, an apparatus for economically isolating a USB peripheral from a USB host, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Figure 1:
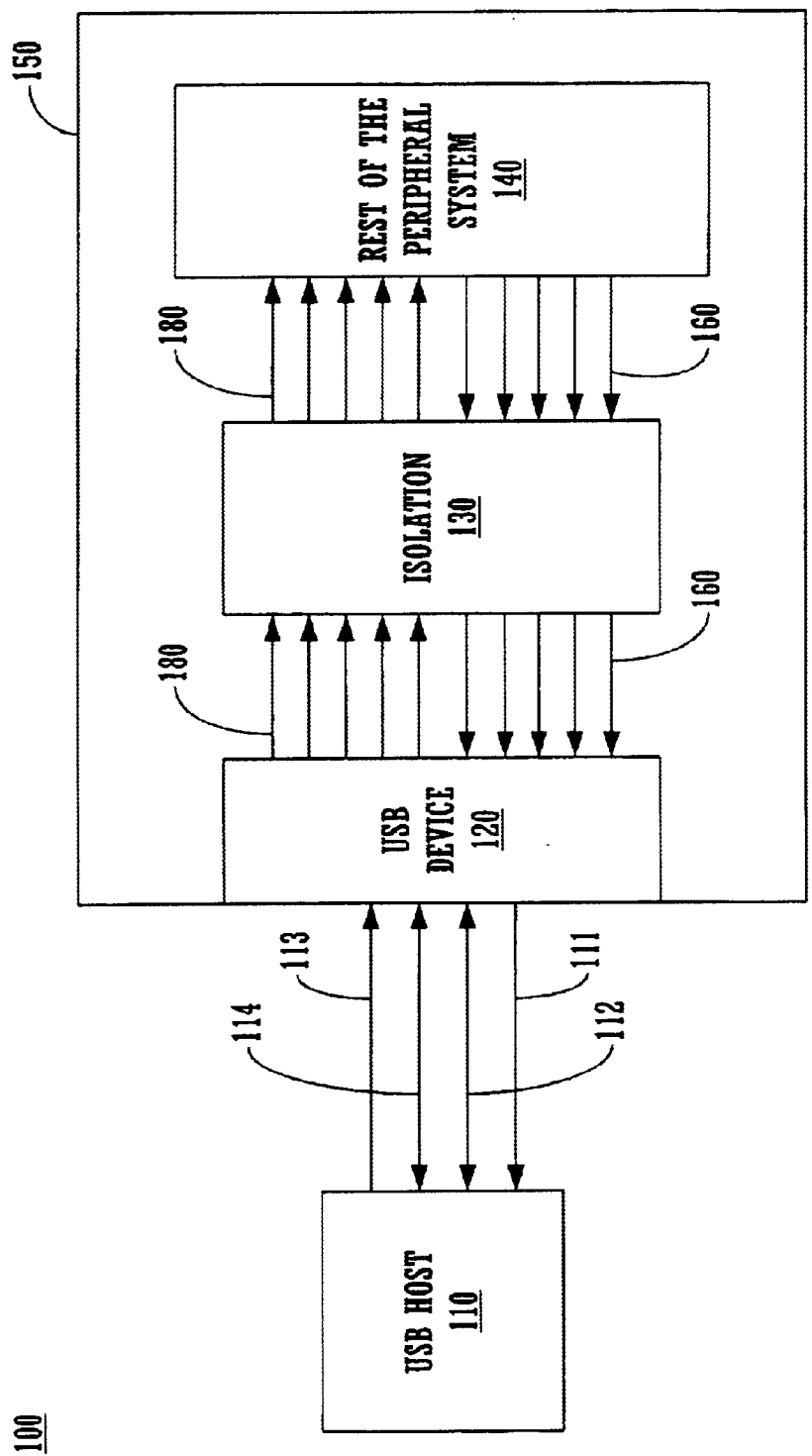
FIG. 1 illustrates a method of isolating a peripheral device from a host computer.
Figure 2:
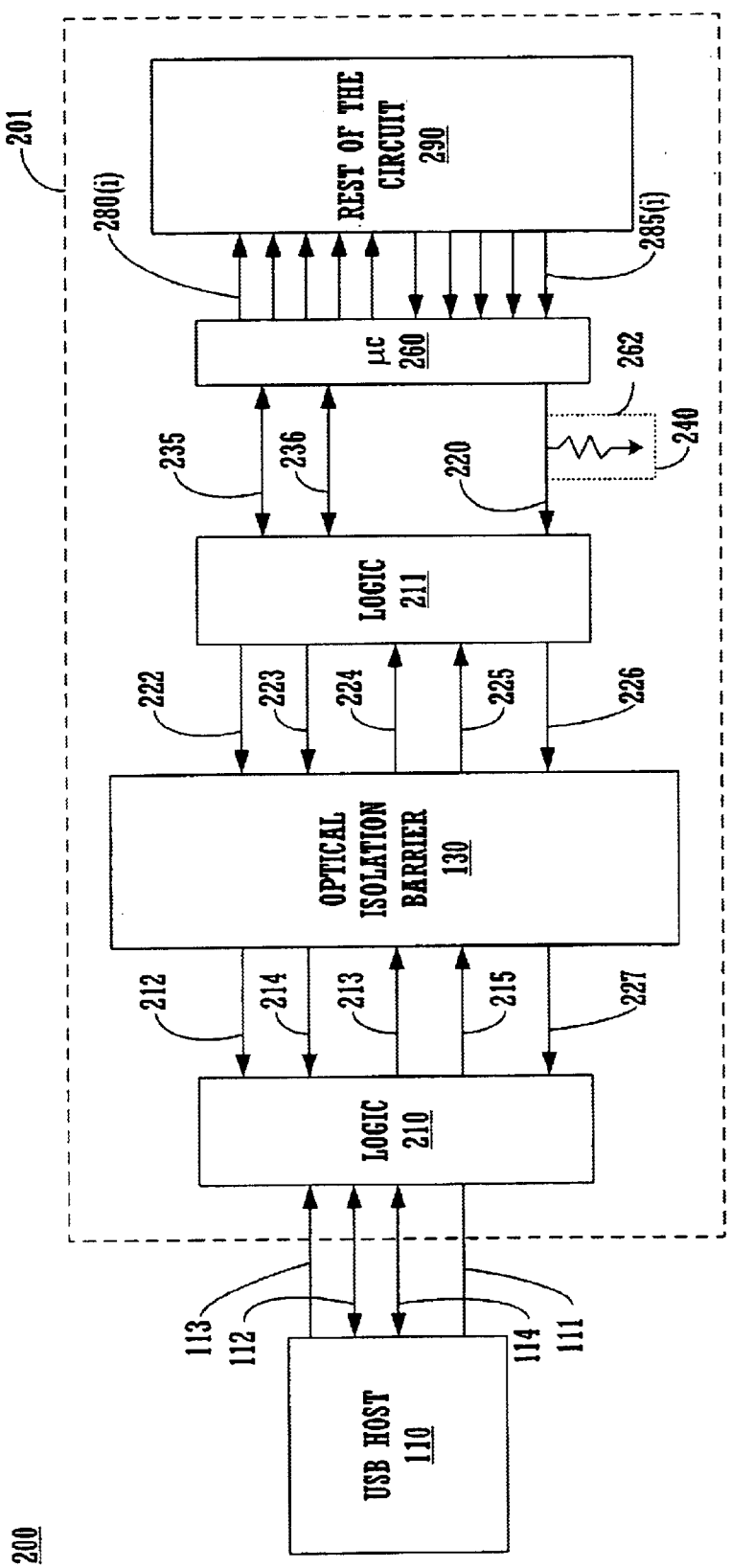
FIG. 2 is an embodiment of the present invention isolating a peripheral from a host device.

FIG. 2 illustrates an embodiment of the present invention isolating peripheral 201 from host device 1by isolating peripheral 201 from serial bus 111–114. Microcontroller 260 interfaces with a plurality of signals 280(i) from the rest of the peripheral circuit 290. Microcontroller 260 communicates with logic 211 through data lines 235 and 236 and uses a control pin 240 as a bus direction control. For example, using the Cypress Semiconductor CY7C63723, the direction signal may be derived from a 'voltage out' pin which floats while the USB microcontroller transmits and drives high when no data is received from the host. In this case pull down resistor 262 is required to establish logic low level of 0 V.

Continuing with FIG. 2, when microcontroller 260 is in transmitting mode, resistor pin 240 is set "low" and it receives a plurality of I/O signals 285(i) from the rest of the peripheral circuit 290. Microcontroller 260 translates signals 285(i) to signals compatible with USB timing which are transmitted over bi-directional data lines 235–236. Unidirectional to bi-directional circuit 211 receives bus direction signal 220 and translates bi-directional signals 235–236 into unidirectional output signal lines 222–223. Signal lines 222–223 transfer differential USB data signals, D+ and D−, in unidirectionally, to optical isolation barrier 130 and from optical isolation barrier isolated data signals D+ and D− are transferred via data lines 212 and 214 to unidirectional to bi-directional converter 210. Optical isolation barrier 130 electrically isolates data signal lines 222–223 from signal lines 212 and 214. Unidirectional to bi-directional converter 210 receives signals 212 and 214 and translates these unidirectional signals to bi-directional signals compatible with serial bus data lines 112 and 114 before transmitting data signals D+ and D– to USB host 1over the serial bus. Converter 211 and 210 utilize the bus direction pin 220 to indicate the conversion direction.

Still referring to FIG. 2, when microcontroller 260 is in receiving mode, microcontroller 260 sets resistor pin 240 "high" and sends direction signal 220 to unidirectional to bi-directional converter 211 (converter 211) and unidirectional to bi-directional converter 210(converter 210) over signal lines 226 and 227, indicating the direction of the transmission. USB host 110 sends differential bi-directional data signals D+ and D– via bi-directional signal lines 112 and 114 to converter 210. Converter 210 buffers transmission of data signals, D+ and D–, via unidirectional signal lines 213 and 215. Data signals, D+ and D–, are transmitted via signal lines 213 and 215 through optical isolation barrier into signal lines 224–225. Optical isolation barrier 130 uses optical elements to electrically isolate signal lines 224–225 from signal lines 213 and 215. Data signals D+ and D– are transmitted via 224–225 to converter 211. Unidirectional to bi-directional converter 211 sends data signals D+ and D– via bi-directional data lines 235–236 to microcontroller 260. Microcontroller 260 then translates the signals received over signal lines 235–236 to signals 280(i) that are compatible with circuit 290.

Concluding with FIG. 2, an embodiment of the present invention presented limits or substantially reduces the number of required isolated signal lines from peripheral device 201 to host device 110. According to this embodiment of the present invention, to achieve an isolation between a peripheral device and a host device a total number of five signal lines, directional signal 220, and signal lines 222, 223, 212 and 214, need to be isolated.

Figure 3:
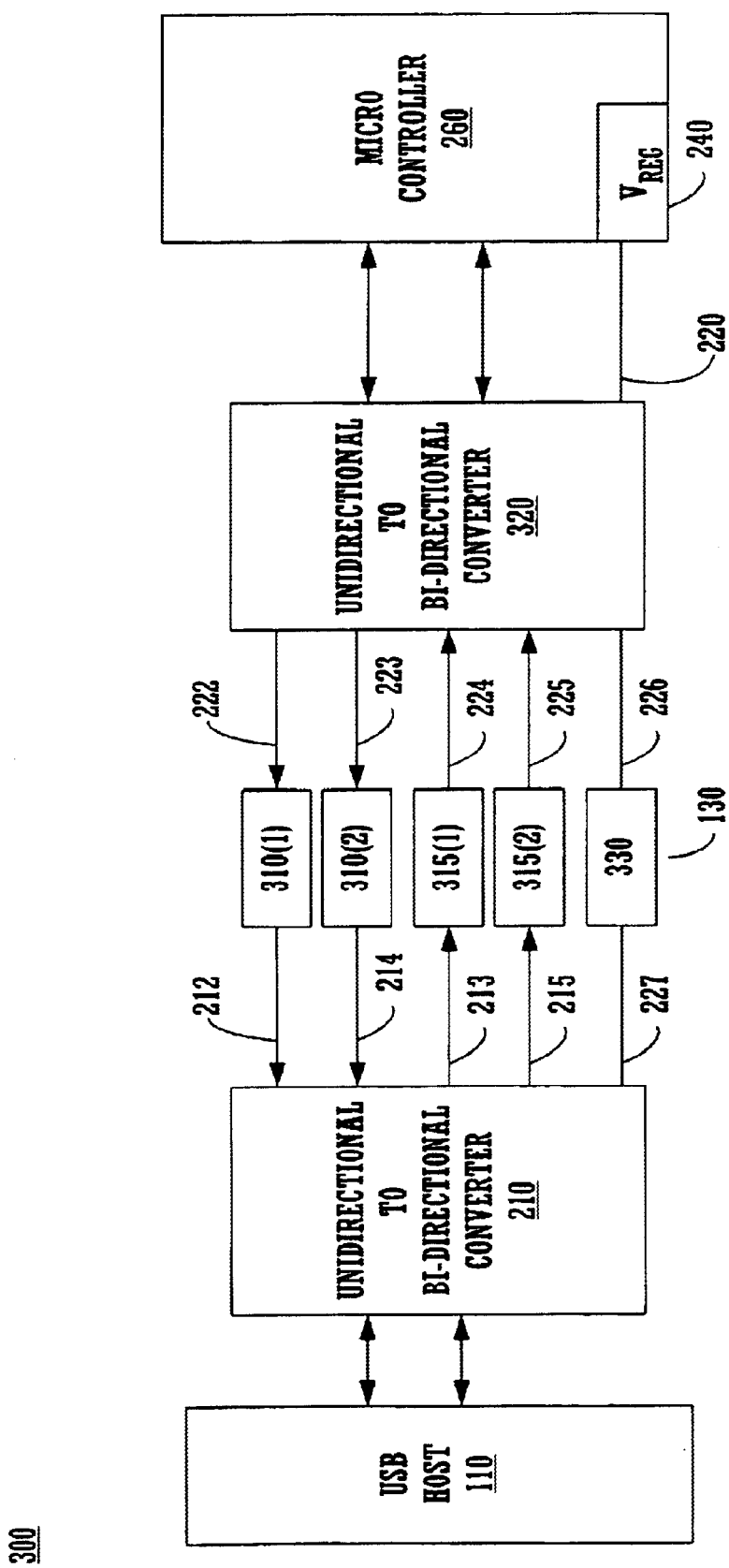
FIG. 3 is an embodiment of the present invention where an optical isolation barrier is depicted.

FIG. 3 is an embodiment of the present invention where optical isolation barrier 130 is described in detail. Optical isolation barrier 130 includes two sets of optical isolating devices 310 and 315 transmitting signals in opposite directions. Optical isolation barrier further includes a fifth optical isolating device 330, which isolates the bus direction signal line.

Microcontroller 260 releases the direction pin for an external resistor to pull this signal low when it is in transmitting mode. Under this mode, data signals are transmitted via signal lines 222, 223, 212, and 214. However, optical isolation device 310(1) optically isolates signal lines 222 from signal lines 212 and optical isolation device 310(2) optically isolates signal lines 223 from 214. When microcontroller 260 is in listening mode, microcontroller 260 drives direction pin 240 high, data transmission is via signal lines 213 and 215 through optical isolation barrier and via signal lines 224–225. Optical isolation device 315(1) optically isolates signal lines 213 and 224 and optical isolation device 315(2) isolates signal lines 215 and 225. Optical isolation device 330 isolates direction signal lines 226 and 227.

Figure 4A:
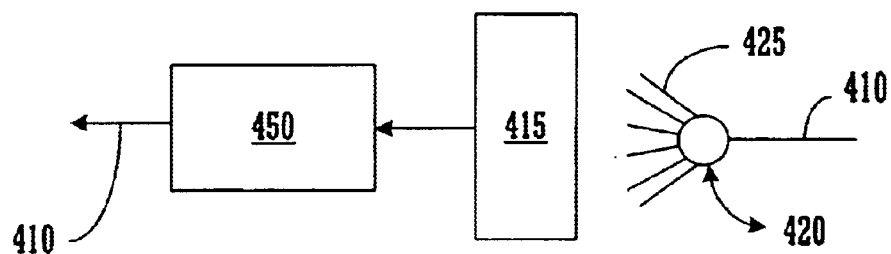
FIGS. 4A and 4B are illustrations of optical isolation elements of the peripheral device.

FIG. 4A depicts an optical isolation device, which receives I/O signal 410 from a transmitting device. Light emitting diode 420 converts signal 410 into light 425. Photo detector 415 receives light 425 and device 450 converts the light 425 into a signal 410 and transmits it to a receiving device. Device 310 provides transmission of data while transmitting and receiving devices are physically isolated.

Figure 4B:
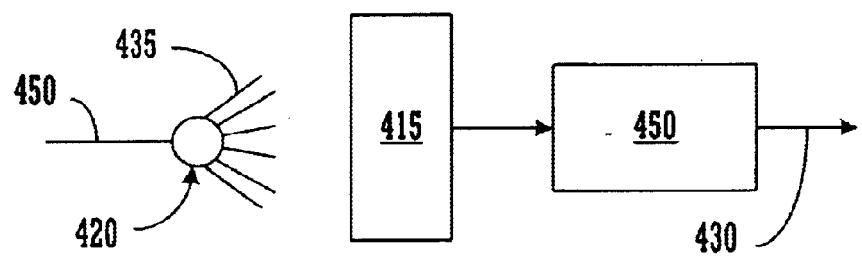

FIG. 4B depicts an isolating system 315, which operates as system 310, except that the data transmission is in the opposite direction.

Figure 5:
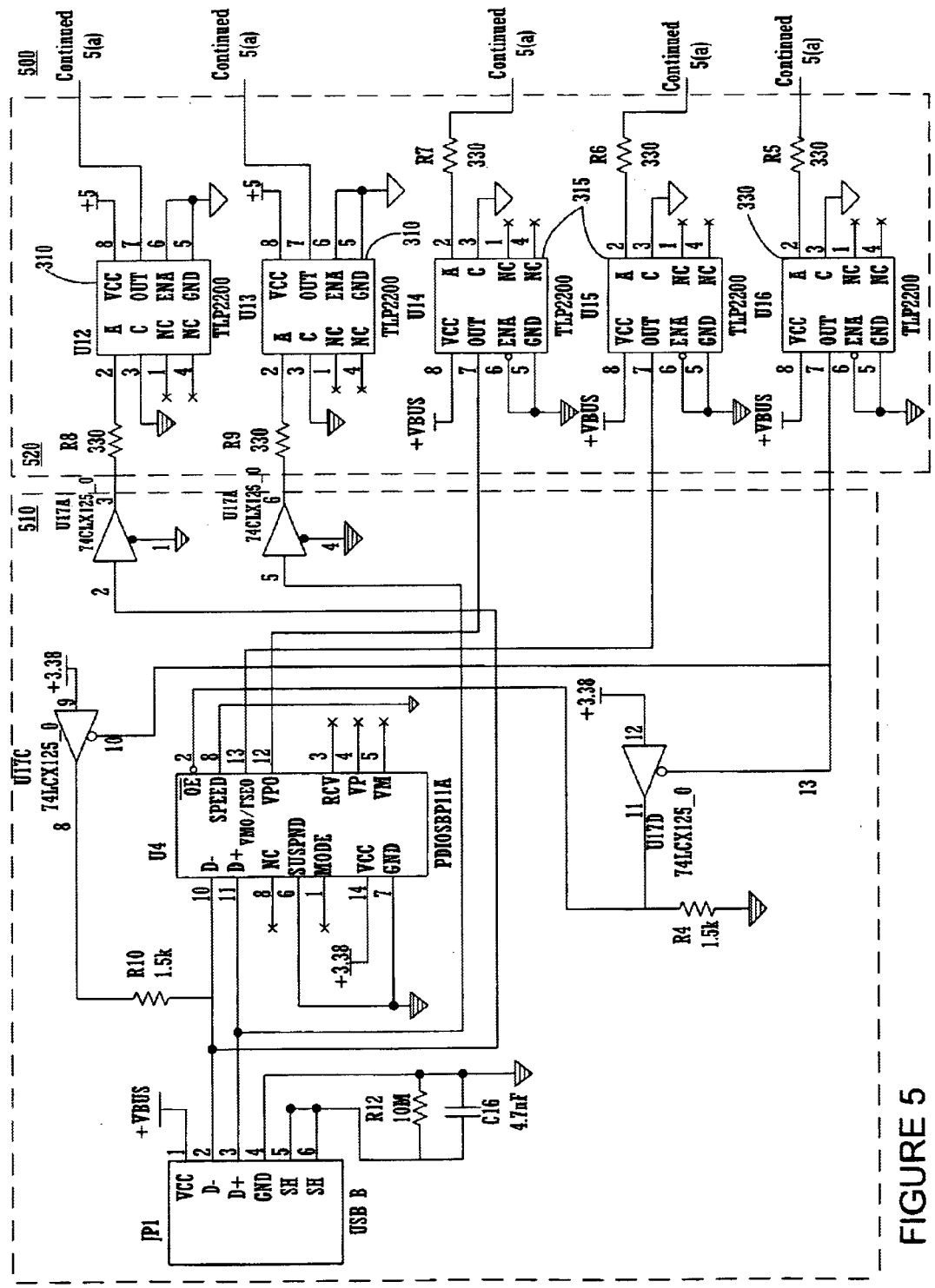
FIG. 5 is an embodiment of the present invention where a peripheral device is isolated from a host device.
Figure 5A:
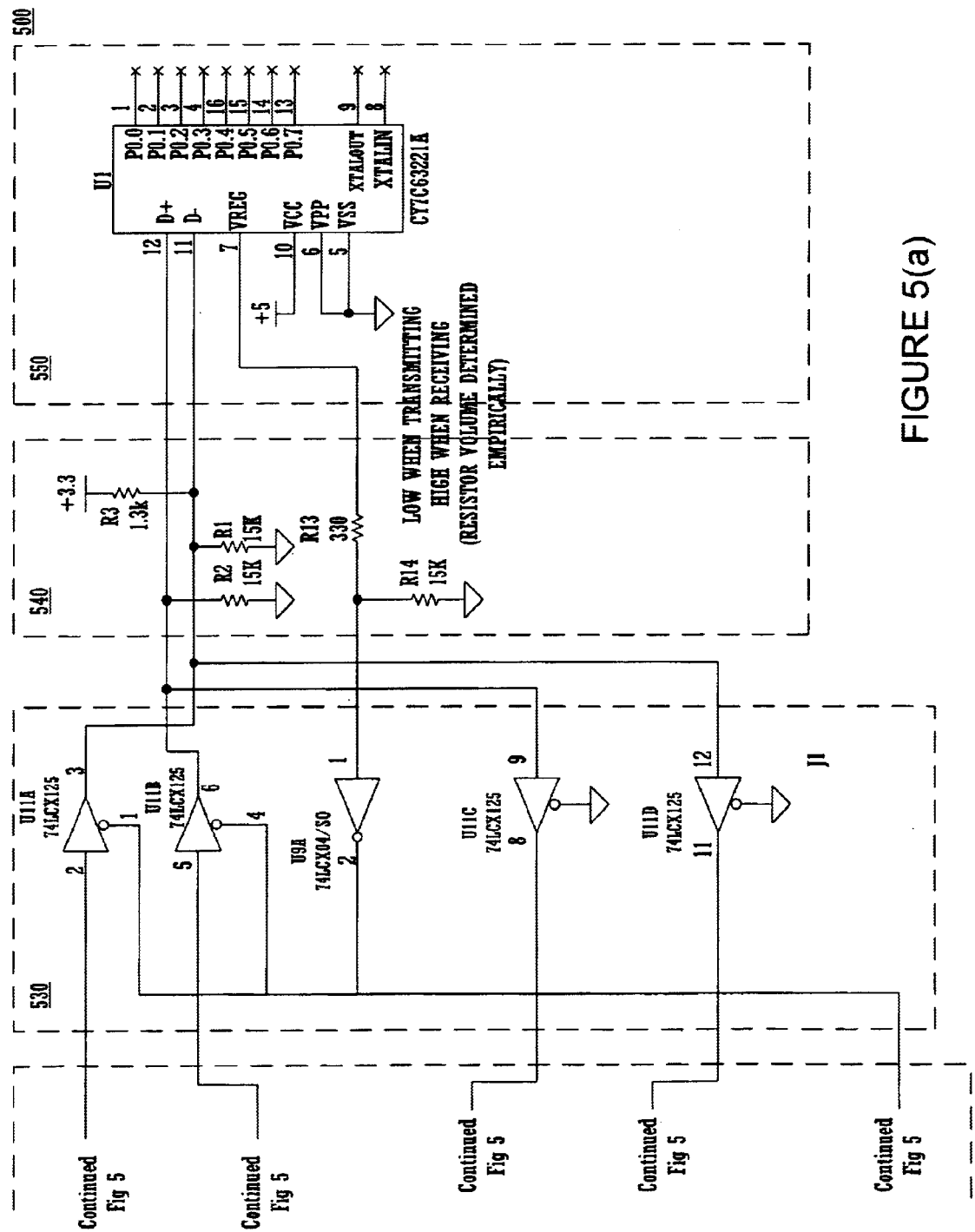

FIG. 5 is detailed schematic embodiment of the present invention where a peripheral device is isolated from a host device. Microprocessor 550 receives and transmits a plurality of I/O signals. Unidirectional to bi-directional logic 530 receives the USB D+ and D– signals and transmits the signals to Opto Isolator 520. Opto Isolator 520 includes a pair of isolation device 310 and a pair of isolation device 315 and isolation device 330 for isolating direction signal. Opto isolator 5transmits the signals received from peripheral 110 to host device interface 510, which in turn will be transmitted to a host device.

FIG. 6 is a flowchart of the steps in a process 600 for isolating a USB peripheral device from a USB host computer in accordance to one embodiment of the present invention. In the present embodiment, process 600 is implemented using an interface circuit connected to the peripheral device 201 of FIG. 2. However, it is appreciated that process 600 can also be implemented using a host computer embedded into another device.

In step 610, the microcontroller translates between input output (I/O) signals of the peripheral device logic and serial bus signals wherein the serial bus signals are fewer in number than the I/O signals.

In step 620, the isolator electronically isolates the bus signals to generate isolated bus signals.

In step 630, circuitry is used to interface the isolated bus signals over the serial bus to electrically isolate the peripheral device logic from the USB.

The foregoing description of specific embodiment of the present invention has been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the Invention be defined by the Claims appended hereto and their equivalents.

What is claimed is:

1. A peripheral device having bus isolation and comprising:
    a signal translator receiving a plurality of input/output (I/O) signals from a peripheral device logic and for translating between said plurality of I/O signals and a plurality of bus signals which are fewer in number than said plurality of I/O signals;
    a first unidirectional to bi-directional converter coupled to said signal translator;
    an optical isolation barrier coupled to said first unidirectional to bi-directional converter via first unidirectional signal lines;
    a second unidirectional to bi-directional converter coupled to said optical isolation barrier via second unidirectional signal lines that are electronically isolated from said first unidirectional lines, said second converter for generating a plurality of isolated bus signals; and
    an interface for interfacing with a serial bus using said plurality of isolated bus signals.

2. The peripheral device of claim 1 wherein said translator circuit is a microcontroller which signals bus communication direction by a dedicated bus direction signal pin that is coupled to both of said first and second unidirectional to bi-directional converters.

3. The peripheral device of claim 2 wherein said microcontroller controls the direction of transmission of said first and said second unidirectional to bi-directional converters via said bus direction signal.

4. The peripheral device of claim 2 where said signal pin comprises a logic high driver and an external pull down resistor.

5. The peripheral device of claim 1 wherein said optical isolation barrier electronically isolates said peripheral device logic from said serial bus.

6. The peripheral device of claim 1 wherein said first unidirectional to bi-directional converter and said second unidirectional to bi-directional converter comprise separate ground potentials.

7. The peripheral device of claim 1 wherein said plurality of bus signals comprises differential data lines.

8. The peripheral device of claim 1 wherein said serial bus is substantially compliant with the USB (Universal Serial Bus) standard.

9. A peripheral device having bus isolation and comprising:
   a microcontroller receiving a set of input/output (I/O) signals from peripheral device logic and for translating between said set of I/O signals and a set of bus signals, wherein said set of bus signals are fewer in number than said set of I/O signals;
   a first unidirectional to bi-directional converter coupled to said microcontroller;
   an optical isolation barrier comprising a plurality of optical isolating devices for electrically isolating said bus signals from a serial bus, said optical isolating barrier coupled to said first unidirectional to bi-directional converter via first unidirectional signal lines;
   a second unidirectional to bi-directional converter coupled to said optical isolation barrier via second unidirectional signal lines and for generating a set of isolated bus signals; and
   a serial bus interface for interfacing with said serial bus using said set of isolated bus signals.

10. The peripheral device of claim 9 wherein said microcontroller signals communication direction by a dedicated bus direction signal pin.

11. The peripheral device of claim 10 wherein said microcontroller controls the direction of transmission of said first and said second unidirectional to bi-directional converters via said bus direction signal pin which is coupled to said first and second unidirectional to bi-directional converters.

12. The peripheral device of claim 9 wherein said optical isolation barrier electrically isolates said peripheral device logic from said serial bus.

13. The peripheral device of claim 9 wherein said first unidirectional to bi-directional converter and said second unidirectional to bi-directional converter comprise separate ground potentials.

14. The peripheral device of claim 9 wherein said set of isolated bus signals comprises of differential data lines.

15. The peripheral device of claim 9 wherein said serial bus is substantially compliant with the USB (Universal Serial Bus) standard.

16. A method for isolating a peripheral device from a host device comprising the steps of:
   a) translating between input output (I/O) signals of peripheral device logic of said peripheral device and serial bus signals wherein said serial bus signals are fewer in number than said I/O signals;
   b) electronically isolating said bus signals to generate isolated bus signals comprising:
      b1) translating between said serial bus signals and first unidirectional signals;
      b2) electrically isolating said first unidirectional signals and second unidirectional signals using optical isolation elements; and
      b3) translating between said second unidirectional signals and said isolated bus signals; wherein said step a) is performed by a microcontroller and wherein said step b1) is performed by a first unidirectional to bi-directional converter based on a bus direction signal generated by said microcontroller and wherein said step b3) is performed by a second unidirectional to bi-directional converter based on said bus direction signal; and
   c) interfacing said isolated bus signals over said serial bus to electrically isolate said peripheral device logic from said serial bus.

17. A method as described in claim 16 wherein said bus signals and said isolated bus signals comprise bi-directional signals.

18. A method as described in claim 17 wherein said bus signals further comprise differential data signals.

19. A method as described in claim 16 wherein said step a) is performed by a microcontroller.

* * * * *